US005172295A

United States Patent [19]

Hegner et al.

[11] Patent Number: 5,172,295

[45] Date of Patent: Dec. 15, 1992

[54] VOLTAGE LIMITER ARRANGEMENT WITH RECEIVING MEMBER FOR CONNECTION TO A SURGE ARRESTER MAGAZINE

[75] Inventors: Gunter Hegner; Klaus-Peter Achtnig, both of Berlin, Fed. Rep. of Germany

[73] Assignee: Krone Aktiengesellschaft, Berlin, Fed. Rep. of Germany

[21] Appl. No.: 645,467

[22] Filed: Jan. 24, 1991

[30] Foreign Application Priority Data

Feb. 9, 1990 [DE] Fed. Rep. of Germany ... 9001687[U]

[51] Int. Cl.[5] ............ H02H 1/04

[52] U.S. Cl. ............ 361/117; 361/119; 361/127

[58] Field of Search ............ 361/117, 119, 124, 129, 361/403, 418; 174/138 G

[56] References Cited

U.S. PATENT DOCUMENTS

| | | | |
|---|---|---|---|
| 4,254,301 | 3/1981 | Serino | 174/138 G |
| 4,319,300 | 3/1982 | Napiorkowski | 361/119 |
| 4,345,294 | 8/1982 | Forberg et al. | 361/119 |
| 4,642,723 | 2/1987 | Achtnig et al. | 361/119 |

*Primary Examiner*—A. D. Pellinen
*Assistant Examiner*—S. Jackson
*Attorney, Agent, or Firm*—McGlew and Tuttle

[57] ABSTRACT

A voltage limiter arrangement, including a voltage limiter including a central connecting lead and outer connecting leads positioned on each side of the central connecting lead. A surge arrester magazine is provided including a surge arrester magazine housing and contacts for connection to leads of the voltage limiter. The surge arrester magazine is provided with an open upper end. A receiving member is provided including a receiving opening for accommodating the voltage limiter, the receiving opening including a bottom wall with openings for each of the central connecting lead and the outer connecting leads. The receiving member includes guide elements for guided insertion of the receiving member into the open end of the arrester magazine for guided connection of the central connected lead and the outer connecting leads with contacts of the surge arrester magazine. The surge arrester magazine open upper end preferably includes an inner wall contour corresponding to the guide means of the receiving member. The receiving member includes an outer wall with openings in communication with the receiving opening. The voltage limiter includes a heat protection element extending through the openings of the outer wall when the voltage limiter is positioned in the receiving opening.

11 Claims, 2 Drawing Sheets

VOLTAGE LIMITER ARRANGEMENT WITH RECEIVING MEMBER FOR CONNECTION TO A SURGE ARRESTER MAGAZINE

FIELD OF THE INVENTION

The present invention relates to a voltage limiter, and in particular to a three-pole voltage limiter with three parts, for application in a surge arrester magazine.

BACKGROUND OF THE INVENTION

A voltage limiter of the above mentioned type is known in the art from DE-PS 30 14 796. This voltage limiter is designed as a three-pole voltage limiter or double arrester, respectively. The double arrester comprises, in a known manner three connecting leads, two of which are connected with the two external pole sides at the front faces of the voltage limiter. The central connecting lead is connected with the central pole side acting as a counter pole for the external pole sides. The two-way arrester is inserted into a surge arrester magazine comprising a centrally arranged earthing rail and insertion elements arranged on either side of the earthing rail. The central connecting lead is inserted into the earthing rail, and the two external connecting leads are inserted into the insertion elements. The insertion elements are connected in a known manner with plug-in tongues extending from the housing of the surge arrester magazine. These plug-in tongues are connected, when inserting the surge arrester magazine into connector banks, with contact elements arranged therein, to the contact elements cable wires which are being contacted. Each insertion element is thus electrically connected with a cable wire. In case of an overvoltage situation, the current will therefore be led away from the external pole side to the central pole side to the central connecting lead, and to the earthing rail. However, it has been discovered that with this construction the voltage limiter with its three connecting leads is easily subject to bending, such that it can only be inserted with difficulty into the surge arrester magazine. When inserting, the connecting leads are very often bent off, such that the voltage limiter cannot be inserted precisely into the receiving member and into the earthing rail. Further, the position of the voltage limiter is extremely unstable, since the voltage limiter is held over its connecting leads only in the surge arrester magazine.

SUMMARY AND OBJECTS OF THE INVENTION

It is an object of the invention to provide a construction to insert the voltage limiter safely into the surge arrester magazine without bending the connecting leads and to provide a stable position for the voltage limiter in the surge arrester magazine.

The invention provides a voltage limiter arrangement particularly for a three-pole voltage limiter with three parts. This voltage limiter is particularly useful for applications in a surge arrester magazine. The voltage limiter arrangement includes a surge arrester magazine with an upper opening for receiving a surge arrester. A receiving potion is provided for accommodation in the upper opening of the surge arrester magazine. The receiving member includes an interior portion with a free space. A voltage limiter is provided positionable in the free space of the receiving member. The receiving member carrying the voltage limiter is insertable into the opening of the surge arrester magazine for guidingly connecting the voltage limiter into the surge arrester magazine.

According to the invention, the voltage limiter is accommodated in a device providing a stable position for the voltage limiter in the surge arrester magazine and ensuring that when inserting the voltage limiter into the receiving member, the connecting leads of the voltage limiter will not be damaged.

Further advantageous embodiments of the invention are provided including the guide sections provided at the bottom side of the receiving member which provide a safe introduction of the connecting leads when inserting into the insertion elements of the surge arrester magazine.

A further object of the invention is to provide a voltage limiter arrangement which is simple in design, rugged in construction, economical to manufacture and durable during use.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
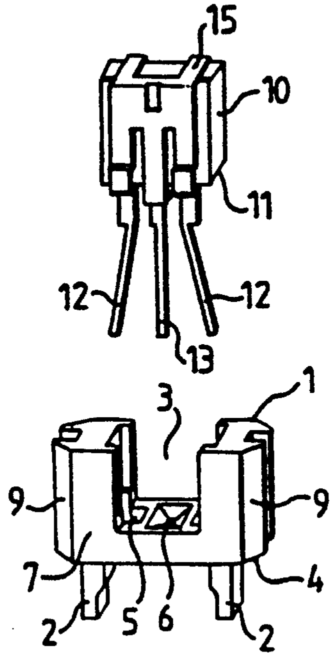
FIG. 1 is a perspective view of a voltage limiter with plug-in section according to the invention.
Figure 3:
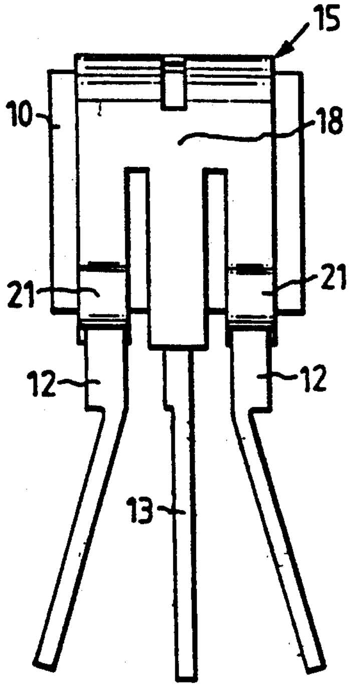
FIG. 3 is a side view of the voltage limiter according to the invention.
Figure 7:
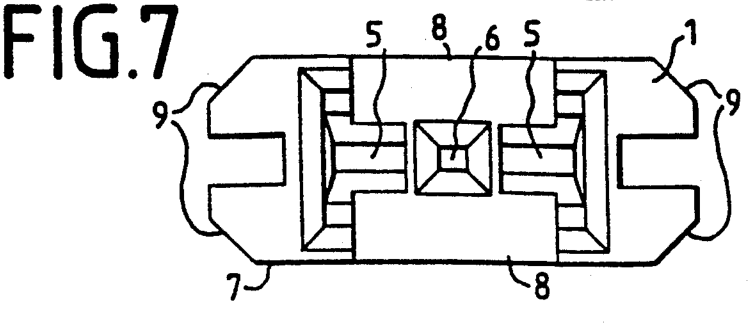
FIG. 7 is a top view of the receiving member.

As is shown in FIG. 1, the voltage limiter 10 comprises a rectangular housing with three connecting leads including outer leads 12, and central lead 13 provided at the bottom side 11 of the housing. The connecting leads 12, 13 are arranged one behind the other in a line. The central connecting lead 13 is located precisely centrally with respect to the two front faces of the voltage limiter 10. All three connecting leads 12, 13 are connected each with an electrical pole in the voltage limiter 10 The receiving member 1 shown in FIG. 1 comprises a rectangular housing body made of plastic. The receiving member 1 is provided in its interior with a free space 3. The inner contour of the free space 3 corresponds to the outer contour of the voltage limiter 10. At the bottom side 4 of the receiving member 1 there are also provided, as is shown in FIGS. 3 and 7, three openings 5, 6 for the three connecting leads 12, 13 of the voltage limiter 10. At the side walls 7 of the receiving member 1 there are provided free spaces 8 for receiving a heat protection 15, as will be explained below. At the bottom side 4 there are provided two downwardly extending guide sections 2. All corner edges of the housing body are made flat, such that inclined faces 9 are formed.

Figure 2:
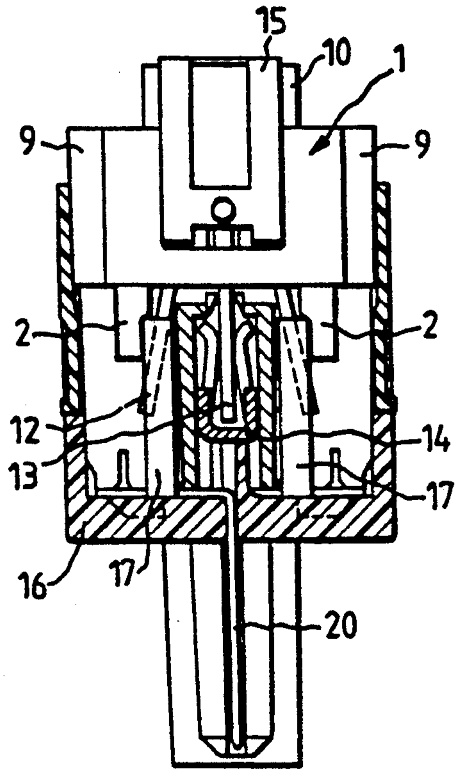
FIG. 2 is a cross-sectional view through the surge arrester magazine according to the invention with receiving member and surge arrester.

FIG. 2 shows a surge arrester magazine 16 with inserted voltage limiter 10 being accommodated in the receiving member 1. The surge arrester magazine 16 comprises a centrally arranged earthing rail 16 having a fork-shaped cross-section. On either side of the earthing rail 14, upwardly extending insertion elements 17 are provided. These insertion elements 17 are connected with plug-in tongues 20 extending from the housing. When inserting the surge arrester magazine 16 in a non-shown connector bank, the plug-in tongues 20 are connected with contact receiving sections arranged in the connector bank. The contact receiving sections are adapted as one piece with insulation displacement contacts, to which cable wires are connected.

Figure 8:
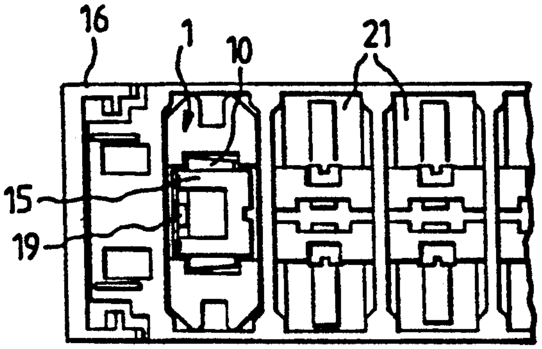
FIG. 8 is a top view of the surge arrester magazine according to the invention shown sectionally.

For inserting the voltage limiter 10 into the surge arrester magazine 16, first the receiving member 1 is inserted from above into a corresponding chamber 21 of the surge arrester magazine 16, until the position shown in FIG. 2 is obtained. In FIG. 8, the surge arrester magazine 16 is shown in a top view. The chambers 21 open toward the top are arranged side by side. In FIG. 8, in the left-hand chamber 21, a receiving member 1 is shown inserted into the chamber 21. The inner contour of the chamber 21 corresponds to the outer contour of the receiving member 1. After inserting the receiving member 1, the voltage limiter 10 is inserted from above into the receiving member 1. The connecting leads 12, 13 of the voltage limiter are inserted through the openings 5, 6 of the receiving member 1, until the connecting leads 12, 13 come into electrical contact with the earthing rail 14 and with the insertion elements 17. The two guide sections 2 provide a guiding action for the two external connecting leads such that the connecting leads 13 are precisely introduced without being damaged. After insertion into the receiving member 1, the voltage limiter 10 has a stable position, since the housing body of the voltage limiter 10 is completely surrounded by the receiving member 1.

Figure 4:
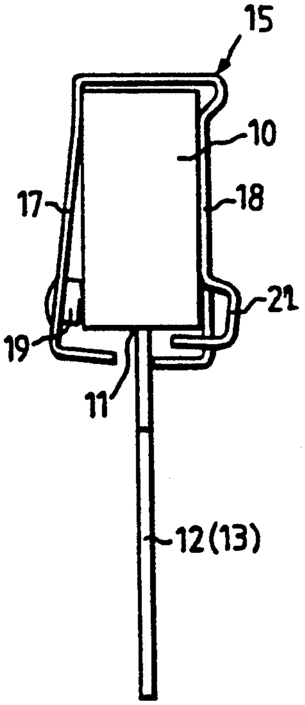
FIG. 4 is a front view of the voltage limiter according to FIG. 3.
Figure 5:
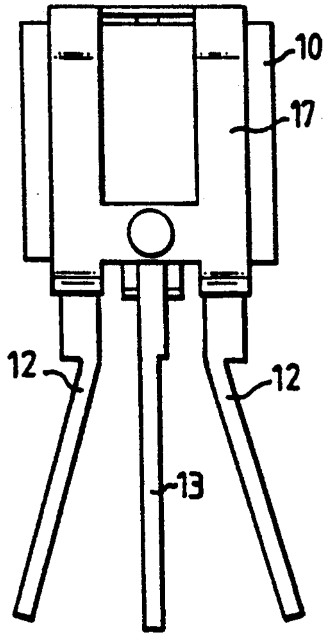
FIG. 5 is a rear view of the voltage limiter according to FIG. 3.
Figure 6:
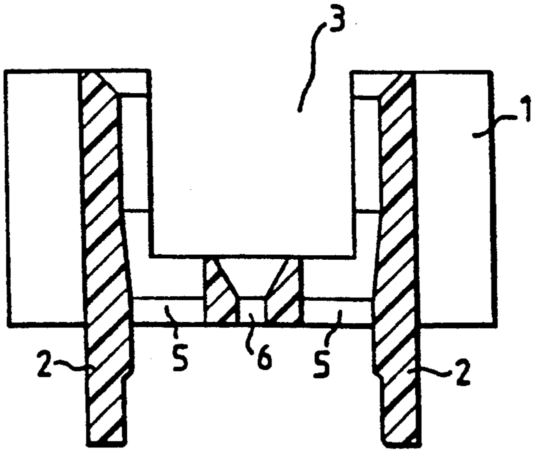
FIG. 6 is a cross-sectional view through the receiving member according to the invention.

The voltage limiter 10 can further be provided with a heat protection element 15, as is shown in particular in FIGS. 3 to 5. The heat protection element 15 comprises a U-shaped bracket spring. The first leg 18 of the U-shaped bracket spring is connected with the central connecting lead 12. The second leg 17 of the U-shaped bracket spring is held spaced from the external connecting leads 13 by means of a melt element 19. Further, support members 22 are provided at the legs 18. These support members rest against the bottom side 11 of the voltage limiter 10 and clamp the bracket spring fast at the voltage limiter 10. In case of an overvoltage situation, no heating or damaging of the voltage limiter 10 can occur, since the melt element 19 will melt when the voltage limiter 10 is heated, and thus bridging of the two external connecting leads 13 to the central connecting lead 12 is established, such that the overvoltage is lead away directly over the heat protection 15 to earth (ground). As mentioned above, the receiving member 1 is provided for this purpose with a free space 8, such that the bracket spring 20 will, when inserting the voltage limiter 10 into the receiving member 1, be accommodated in said free space 8, as is shown in FIG. 8.

While a specific embodiment of the invention has been shown and described in detail to illustrate the application of the principles of the invention, it will be understood that the invention may be embodied otherwise without departing from such principles.

What is claimed is:

1. A voltage limiter arrangement, particularly for a three-pole voltage limiter with three parts, particularly for application in a surge arrester magazine, comprising: a voltage limiter; a receiving member including a receiving opening for receiving the voltage limiter; and a surge arrester magazine with an opening, said receiving member carrying said voltage limiter being positionable within said surge arrester magazine wherein said receiving member is formed with a substantially rectangular housing body, said receiving opening toward a top of said rectangular housing body, said receiving opening having an inner contour adapted to the outer contour of the voltage limiter.

2. A voltage limiter arrangement according to claim 1, wherein said receiving opening of said receiving member includes a bottom side with three openings, said three openings being provided for inserting the connecting leads of the voltage limiter therethrough.

3. A voltage limiter arrangement according to claim 1, wherein said receiving member includes outer side walls defining outer side wall openings in communication with said receiving opening, said voltage limiter including a heat protection element, said heat protection element being positionable extending through said side wall opening when said voltage limiter is positioned in said receiving opening.

4. A voltage limiter according to claim 1, further comprising: a heat protection element connected to said voltage limiter, said heat protection element including a U-shaped bracket spring with a first leg connected to a central connecting lead of said voltage limiter, a second leg positioned held spaced from at least one of two outer connecting leads of the voltage limiter by a melt element.

5. A voltage limiter according to claim 1, wherein said receiving member includes guide sections at a bottom side for guiding said receiving member into said surge arrester magazine.

6. A voltage limiter arrangement, comprising: a voltage limiter including a central connecting lead and outer connecting leads positioned on each side of said central connecting lead; a surge arrester magazine including a surge arrester magazine housing and contacts for connection to leads of said voltage limiter, said surge arrester magazine having an open upper end; and, a receiving member including a receiving opening for accommodating said voltage limiter, said receiving opening including a bottom wall with openings for each of said central connecting lead and said outer connecting leads, said receiving member including guide elements for guiding insertion of said receiving member into the open upper end of said arrester magazine for guided connection of said central connected lead and said outer connecting leads with contacts of said surge arrester magazine.

7. A voltage limiter arrangement according to claim 6, wherein said surge arrester magazine open upper end includes an inner wall contour corresponding to said guide means of said receiving member.

8. A voltage limiter arrangement according to claim 7, wherein said receiving member includes an outer wall with openings in communication with said receiving opening, said voltage limiter including a heat protection element extending through said openings of said outer wall when said voltage limiter is positioned in said receiving opening.

9. A voltage limiter arrangement according to claim 8, wherein said heat protection element includes a U-shaped bracket spring connected to a housing of said voltage limiter with a first leg connected to said central connecting lead and outer legs spaced from each of said outer connecting leads by a melt element.

10. A voltage limiter arrangement, particularly for a three-pole voltage limiter with three parts, particularly for application in a surge arrester magazine, comprising: a voltage limiter; a receiving member including a receiving opening for receiving the voltage limiter; and a surge arrester magazine with an opening, said receiving member carrying said voltage limiter being positionable within said surge arrester magazine, said receiving member including guide sections and a bottom side for guiding said receiving member into said surge arrester in magazine.

11. A voltage limiter arrangement, comprising: a voltage limiter including three connecting leads; a surge arrester magazine including a surge arrester magazine housing and contacts for connection to said three leads of said voltage limiter, said surge arrester magazine having an open upper end; a receiving member including a receiving opening for insertion of said voltage limiter and for accommodating said voltage limiter, said receiving opening including a bottom wall with openings for each of said three connecting leads, allowing said three connecting leads to extend from said receiving member when said voltage limiter is accommodated in said receiving member, said receiving member being shaped for positioning in said open upper end of said arrester magazine for connection of said three connecting leads to said surge arrester magazine.

* * * * *